(12) United States Patent
Vega-Morales et al.

(10) Patent No.: US 12,550,920 B2
(45) Date of Patent: Feb. 17, 2026

(54) RECONSTITUTED CEREAL-LEGUME KERNELS

(71) Applicant: MARS, INCORPORATED, McLean, VA (US)

(72) Inventors: Cesar Vega-Morales, Hackettstown, NJ (US); Felix Kormelink, Hackettstown, NJ (US)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 18/408,451

(22) Filed: Jan. 9, 2024

(65) Prior Publication Data

US 2024/0260626 A1 Aug. 8, 2024

Related U.S. Application Data

(63) Continuation of application No. 16/341,834, filed as application No. PCT/US2017/056543 on Oct. 13, 2017, now abandoned.

(60) Provisional application No. 62/408,537, filed on Oct. 14, 2016.

(51) Int. Cl.
  *A23L 19/00* (2016.01)
  *A23L 7/126* (2016.01)
  *A23L 7/143* (2016.01)
  *A23L 29/212* (2016.01)

(52) U.S. Cl.
  CPC .............. *A23L 19/09* (2016.08); *A23L 7/126* (2016.08); *A23L 7/143* (2016.08); *A23L 29/212* (2016.08)

(58) Field of Classification Search
  CPC ........ A23V 2002/00; A23V 2250/5118; A23V 2250/184; A23V 2250/5104; A23L 7/109; A23L 7/10; A23L 7/00; A23L 7/196; A23L 19/09; A23L 7/126; A23L 9/212; A23L 7/143
  USPC ..................... 426/549, 622, 634, 618, 18, 46
  See application file for complete search history.

(56) References Cited

U.S. PATENT DOCUMENTS

| | | |
|---|---|---|
| 4,237,170 A | 12/1980 | Satin |
| 4,517,215 A | 5/1985 | Hsu |
| 4,590,084 A | 5/1986 | Miller |
| 5,252,351 A | 10/1993 | Cox |
| 5,609,896 A | 3/1997 | Cox |
| 5,786,018 A | 7/1998 | Toh |
| 6,287,621 B1 | 9/2001 | Lacourse |
| 8,465,785 B2 | 6/2013 | Anfinsen et al. |
| 8,613,971 B2 | 12/2013 | Finocchiaro |
| 8,871,270 B2 | 10/2014 | Zhang |
| 8,877,277 B2 | 11/2014 | Ganjyal |
| 8,956,679 B2 | 2/2015 | Dkoniewska |
| 9,107,435 B2 | 8/2015 | Kormelink |
| 2003/0113429 A1 | 6/2003 | McNaught et al. |
| 2006/0073259 A1 | 4/2006 | Kato |
| 2006/0246202 A1 | 11/2006 | Karwowski et al. |
| 2006/0263503 A1 | 11/2006 | Okoniewska |
| 2007/0207240 A1 | 9/2007 | Hansen et al. |
| 2008/0145483 A1 | 6/2008 | Berrios et al. |
| 2013/0071491 A1 | 3/2013 | Berrios |
| 2014/0287130 A1 | 9/2014 | Drew |
| 2014/0302225 A1 | 10/2014 | Kormelink et al. |

FOREIGN PATENT DOCUMENTS

| | | |
|---|---|---|
| CN | 103110066 A | 5/2013 |
| CN | 103284050 A | 9/2013 |
| CN | 103535597 A | 1/2014 |
| EP | 3 087 839 B1 | 4/2019 |
| WO | WO 92/018325 A1 | 10/1992 |
| WO | WO 93/019125 A1 | 9/1993 |
| WO | WO 2002/041707 A1 | 5/2002 |
| WO | WO 2002/074814 A1 | 9/2002 |
| WO | WO 2006/130713 A1 | 12/2006 |
| WO | WO 2013/003712 A1 | 1/2013 |

OTHER PUBLICATIONS

U.S. Appl. No. 16/341,834 (Abandoned), filed Apr. 12, 2019.
U.S. Appl. No. 16/341,834, Jan. 31, 2024 Abandonment.
U.S. Appl. No. 16/341,834, Sep. 18, 2023 Advisory Action.
U.S. Appl. No. 16/341,834, Sep. 6, 2023 Response After Final Action.
U.S. Appl. No. 16/341,834, Jul. 10, 2023 Final Office Action.
U.S. Appl. No. 16/341,834, Apr. 26, 2023 Response to Non-Final Office Action.
U.S. Appl. No. 16/341,834, Jan. 26, 2023 Non-Final Office Action.
U.S. Appl. No. 16/341,834, Dec. 20, 2022 Request for Continued Examination (RCE).
U.S. Appl. No. 16/341,834, Dec. 2, 2022 Advisory Action.
U.S. Appl. No. 16/341,834, Nov. 28, 2022 Response After Final Action.
U.S. Appl. No. 16/341,834, Nov. 28, 2022 Amendment and Request for Continued Rexamination (RCE).
U.S. Appl. No. 16/341,834, Sep. 28, 2022 Final Office Action.
U.S. Appl. No. 16/341,834, Aug. 12, 2022 Response to Non-Final Office Action.
U.S. Appl. No. 16/341,834, May 13, 2022 Non-Final Office Action.
U.S. Appl. No. 16/341,834, Mar. 4, 2022 Request for Continued Examination (RCE).
U.S. Appl. No. 16/341,834, Mar. 1, 2022 Advisory Action.
U.S. Appl. No. 16/341,834, Feb. 22, 2022 Response After Final Action.
U.S. Appl. No. 16/341,834, Feb. 22, 2022 Amendment and Request for Continued Examination (RCE).
U.S. Appl. No. 16/341,834, Dec. 21, 2021 Final Office Action.

(Continued)

*Primary Examiner* — Hong T Yoo
(74) *Attorney, Agent, or Firm* — Baker Botts L.L.P.

(57) ABSTRACT

The present disclosure is generally directed to reconstituted kernel compositions, especially to shelf-stable and precooked reconstituted kernel compositions having a cereal component and a legume component, and to methods of making the same.

9 Claims, 2 Drawing Sheets

(56) References Cited

OTHER PUBLICATIONS

U.S. Appl. No. 16/341,834, Oct. 15, 2021 Response to Non-Final Office Action.
U.S. Appl. No. 16/341,834, Apr. 15, 2021 Non-Final Office Action.
U.S. Appl. No. 16/341,834, Jan. 20, 2021 Response to Restriction Requirement.
U.S. Appl. No. 16/341,834, Oct. 30, 2020 Restriction Requirement.
"Organic Chickpea Fusilli" [retrieved from internet on May 24, 2022], Mintel Gnpd, Record ID: 4288055, Date Published: Sep. 2016, 5 pgs.
Baik, Byung-Kee Lee, et al., Effects of starch amylase content of wheat on textural properties of white salted noodles, Cereal Chemistry, May 2003, p. 304-309, vol. 80, Issue 3, American Association of Cereal Chemists.
Bett-Garber et al., "Correlation of Sensory, Cooking, Physical, and Chemical Properties of Whole Grain Rice with Diverse Bran Color," Cereal Chem. 90(6):521-528 (2013).
Bett-Garber, K.L. et al., Correlation of Sensory, Cooking, Physical, and Chemical Properties of Whole Grain Rice with Diverse Bran Color, Cereal Chem. 90(6) (Nov. 2013), 521-528.
Bogart, John, Moisture Content vs Water Activity: Use Both to Optimize Food Safety and Quality, pp. 1-8, Apr. 26, 2018. https://blog.kett.com/bid/362219/moisture-content-vs-water-activity-use-both-to-optimize-food-safety-and-quality (Year: 2018).
Giuberti, G. et al., Cooking quality and starch digestibility of gluten free pasta using new bean flour, Food Chemistry, vol. 175, May 15, 2015, p. 43-49.
Indrani et al., Effect of multigrains on rheological, microstructural and quality characteristics of north Indian parotta—An Indian flat bread, LWT—Food Science and Technology 44; Apr. 3, 2011, 719-724.
International Search Report and Written Opinion from International Application No. PCT/US2017/056543 dated Oct. 13, 2017.
Mariotti, M. et al., Characterisation of gluten-free pasta through conventional and innovative methods: Evaluation of he uncooked products, Journal of Cereal Science, vol. 53, Feb. 2011, p. 319-327.
Marti, A. et al., What can play the role of gluten in gluten free pasta?, Trends in Food Science & Technology, vol. 31, May 2013, p. 63-71.
Mishra, A. et al., Preparation of rice analogues using extrusion technology, International Journal of Food Science and Technology, 47(Jun. 2012), 1789-1797.
Prepared Foods, Phospholipids from Egg Yolks, Apr. 27, 2009 https://www.preparedfoods.com/articles/107033-phospholipids-from-egg-yolks (Year: 2009).
Shauhan, G.S. et al., Effect of some extruder variables on physicochemical properties of extruded rice—Legume blends, Food Chemistry, (1988), 213-224, vol. 27, Issue 3.
Thachil et al., "Amylase-lipid complex formation during extrusion cooking: effect of added lipid type and amylose level on corn-based puffed snacks", International Journal of Food Science & Technology, 2014, 49, 309-316.
Valle, Della G., et al., Extrusion behaviour of potato starch, Carbohydrate Polymers, 28(3), Oct. 1995, p. 255-264.
Wang et al., "Pasta-Like Product from Pea Flour by Twin-Screw Extrusion," Journal of Food Science 64(4):671-678 (1999).
Wang, N. et al., Pasta-like Product from Pea Flour by Twin-Screw Extrusion, Journal of Food Science 64(4) (Jun. 1999), 671-8.

RECONSTITUTED CEREAL-LEGUME KERNELS

PRIORITY CLAIM

This patent application is a continuation of U.S. patent application Ser. No. 16/341,834 filed on Apr. 12, 2019, which is a National Stage Entry Application of International Patent Application No. PCT/US17/56543, filed on Oct. 13, 2017, which claims priority to U.S. Provisional Patent Application Ser. No. 62/408,537, filed Oct. 14, 2016, the contents of each which are incorporated by reference in their entireties, and to which priority is claimed.

FIELD OF THE INVENTION

This present disclosure relates to a reconstituted kernel composition and methods of making the same.

BACKGROUND

For large parts of the population, especially in rural areas, simple and nutritionally poor carbohydrates are staple foods providing a large part of the daily caloric intake. There is a clear need to provide these populations with a food product that has improved nutritional value (including enhanced carbohydrate quality and superior protein and micronutrient content), while being convenient, and offering a variety of cooking and eating experiences.

BRIEF SUMMARY

The present disclosure relates to a food product in the form of a reconstituted kernel composition from a mixture that includes a combination of at least a cereal and a legume. In some embodiments, the reconstituted kernel composition is prepared through the use of an extrusion process. The food product preferably possesses one or more of the following features: 1) has a short cooking time, 2) provides pleasing tastes and familiar textures (for example, textures similar to pasta), and 3) provides a long lasting and sating experience while having a high nutritional value. In certain embodiments, the food product is a dense product with a texture similar to that of pasta, rather than an expanded air-filled food product.

The present disclosure is further generally directed to reconstituted kernel compositions, especially to shelf-stable and precooked reconstituted kernel compositions, having at least a cereal component and a legume component, and to methods of making the same.

Accordingly, certain aspects of the present disclosure relate to a reconstituted kernel composition having a cereal component and a legume component, and where the reconstituted kernel composition has an amylose content sufficient to yield a reconstituted composition having a cooking performance index (CPI) of 1 to 5. In some embodiments, the reconstituted kernel composition excludes further ingredients. In some embodiments, the cereal component alone provides the amylose content. In some embodiments, the legume component alone provides the amylose content. In some embodiments, the mixture of the cereal component and the legume component supplies the amylose content. In some embodiments, the reconstituted kernel composition excludes any additional component that contains amylose. In some embodiments, the CPI is 2 or more, 3 or more, or 4 or more. In some embodiments, the CPI is greater than 1, greater than 2, greater than 3 or greater than 4. In some embodiments, the CPI is less than 5, less than 4, less than 3, or less than 2. In some embodiments, the CPI is 4 or less, 3 or less, or 2 or less. In some embodiments, the CPI is 1, 2, 3, 4, or 5. In some embodiments, the reconstituted kernel composition excludes an emulsifier component. In alternative embodiments, the reconstituted kernel composition further includes an emulsifier component. In some embodiments, the reconstituted kernel composition includes 0.6 wt. % or less emulsifier component. In some embodiments, the reconstituted kernel composition includes from about 0.5 wt. % to about 0.01 wt. % emulsifier component. In some embodiments, the reconstituted kernel composition includes 0.01 wt. % or less emulsifier component. In some embodiments, the reconstituted kernel composition excludes any additional component that contains amylose.

Other aspects of the present disclosure relate to a reconstituted kernel composition having a cereal component, a legume component, and an emulsifier component, where the reconstituted kernel composition includes an amylose content sufficient to yield a reconstituted composition having a cooking performance index (CPI) of 1 to 5, and where the reconstituted kernel composition includes 0.6 wt. % or less emulsifier component. In some embodiments, the reconstituted kernel composition includes from about 0.5 wt. % to about 0.01 wt. % emulsifier component. In some embodiments, the reconstituted kernel composition includes 0.01 wt. % or less emulsifier component. In some embodiments, the cereal component alone provides the amylose content. In some embodiments, the legume component alone provides the amylose content. In some embodiments, the mixture of the cereal component and the legume component supplies the amylose content. In some embodiments, the reconstituted kernel composition excludes any additional component that contains amylose.

Other aspects of the present disclosure relate to a method for producing a reconstituted kernel composition, by: a. formulating a blend of a cereal component and a legume component; b. extruding the blend at a temperature and specific mechanical energy input sufficient to yield a reconstituted kernel composition, where the reconstituted kernel composition has an amylose content sufficient to yield a reconstituted composition having a cooking performance index (CPI) of 1 to 5; and c. drying the extruded blend at a temperature, relative humidity, and amount of time that is sufficient to prevent kernel cracking in the reconstituted kernel composition, where the relative humidity is at least 45%. In some embodiments, the drying temperature is about 85° C. In some embodiments, the drying time is about 180 minutes. In some embodiments, the drying step increases amylose retrogradation, as compared to drying at a temperature that is less than 85° C., a relative humidity that is less than 45%, and a drying time that is less than 180 minutes. In some embodiments, the reconstituted kernel composition excludes further ingredients. In some embodiments, the reconstituted kernel composition excludes an emulsifier component. In alternative embodiments, the reconstituted kernel composition further includes an emulsifier component. In some embodiments, the reconstituted kernel composition includes 0.6 wt. % or less emulsifier component. In some embodiments, the blend includes from about 0.5 wt. % to about 0.01 wt. % emulsifier component. In some embodiments, the blend includes 0.01 wt. % or less emulsifier component. In some embodiments, the cereal component alone provides the amylose content. In some embodiments, the legume component alone provides the amylose content. In some embodiments, the mixture of the cereal component and the legume component supply the amylose content. In some embodiments, the reconstituted kernel composition excludes any additional component that contains amylose.

In some embodiments that may be combined with any of the preceding embodiments, the reconstituted kernel composition includes an emulsifier component, and the emulsifier component is selected from phospholipids, enzyme digested lecithin, enzyme-treated lecithin, glycerin fatty acid esters, monoglycerides, acetic acid esters of monoglycerides, lactic acid esters of monoglycerides, citric acid esters of monoglycerides, succinic acid esters of monoglycerides, diacetyl tartaric acid esters of monoglycerides, polyglycerol esters of fatty acids, polyglycerol polyricinoleate, sorbitan esters of fatty acids, propylene glycol esters of fatty acids, sucrose esters of fatty acids, calcium stearoyl di lactate, and mixtures thereof. In some embodiments that may be combined with any of the preceding embodiments, the reconstituted kernel composition has a CPI of 1. In some embodiments that may be combined with any of the preceding embodiments, the reconstituted kernel composition includes a complete or almost complete disintegration of kernel structure. In some embodiments that may be combined with any of the preceding embodiments, the reconstituted kernel composition has a porridge-like texture. In some embodiments that may be combined with any of the preceding embodiments, the reconstituted kernel composition has a CPI of 2. In some embodiments that may be combined with any of the preceding embodiments, the reconstituted kernel composition includes a high incidence of broken kernels, a high level of kernel disintegration, and a soft bite of remaining kernels. In some embodiments that may be combined with any of the preceding embodiments, the reconstituted kernel composition has a CPI of 3. In some embodiments that may be combined with any of the preceding embodiments, the reconstituted kernel composition includes a roughly equal distribution of intact kernels and broken kernels, and a medium bite. In some embodiments that may be combined with any of the preceding embodiments, the reconstituted kernel composition has a couscous-like texture. In some embodiments that may be combined with any of the preceding embodiments, the reconstituted kernel composition has a CPI of 4. In some embodiments that may be combined with any of the preceding embodiments, the reconstituted kernel composition includes intact kernels or kernels that have fractured into large fragments, and a firm bite. In some embodiments that may be combined with any of the preceding embodiments, the reconstituted kernel composition has a pasta-like texture. In some embodiments that may be combined with any of the preceding embodiments, the reconstituted kernel composition has a CPI of 5. In some embodiments that may be combined with any of the preceding embodiments, the reconstituted kernel composition includes intact kernels, and a very firm bite. In some embodiments that may be combined with any of the preceding embodiments, the reconstituted kernel composition has a rice-like texture. In some embodiments that may be combined with any of the preceding embodiments, the cereal component and legume component are present at a weight by weight ratio of at least 50:50 cereal to legume. In some embodiments that may be combined with any of the preceding embodiments, the cereal component and legume component are present at a weight by weight ratio of at least 40:60 cereal to legume. In some embodiments that may be combined with any of the preceding embodiments, the cereal component and legume component are present at a weight by weight ratio of at least 30:70 cereal to legume. In some embodiments that may be combined with any of the preceding embodiments, the cereal component and legume component are present at a weight by weight ratio of at least 20:80 cereal to legume. In some embodiments that may be combined with any of the preceding embodiments, the cereal component and legume component are present at a weight by weight ratio of at least 15:80 cereal to legume. In some embodiments that may be combined with any of the preceding embodiments, the reconstituted kernel composition includes 8 wt. % or greater amylose content. In some embodiments that may be combined with any of the preceding embodiments, the reconstituted kernel composition includes from about 8 wt. % to about 50 wt. % amylose content. In some embodiments that may be combined with any of the preceding embodiments, the reconstituted kernel composition excludes an amylose starch component. In alternative embodiments that may be combined with any of the preceding embodiments, the reconstituted kernel composition further includes an amylose starch component. In some embodiments that may be combined with any of the preceding embodiments, the amylose starch component is selected from corn starch, high amylose corn starch, rice starch, and any combination thereof. In some embodiments that may be combined with any of the preceding embodiments, the cereal component, legume component, and amylose starch component are present at a weight by weight ratio of 15:80:1 cereal to legume to amylose starch. In some embodiments that may be combined with any of the preceding embodiments, the reconstituted kernel composition further includes about 35 wt. % total water content. In some embodiments that may be combined with any of the preceding embodiments, the cereal component is selected from a rice flour, a teff flour, a sorghum flour, a white corn flour, and any combination thereof. In some embodiments that may be combined with any of the preceding embodiments, the legume component is from a red lentil flour, a green lentil flour, a chickpea flour, a yellow pea flour, and any combination thereof. In some embodiments that may be combined with any of the preceding embodiments, the reconstituted kernel composition excludes a texturizer component. In some embodiments that may be combined with any of the preceding embodiments, the reconstituted kernel composition excludes a hydrocolloid component.

DETAILED DESCRIPTION

Definitions

Figure 1:
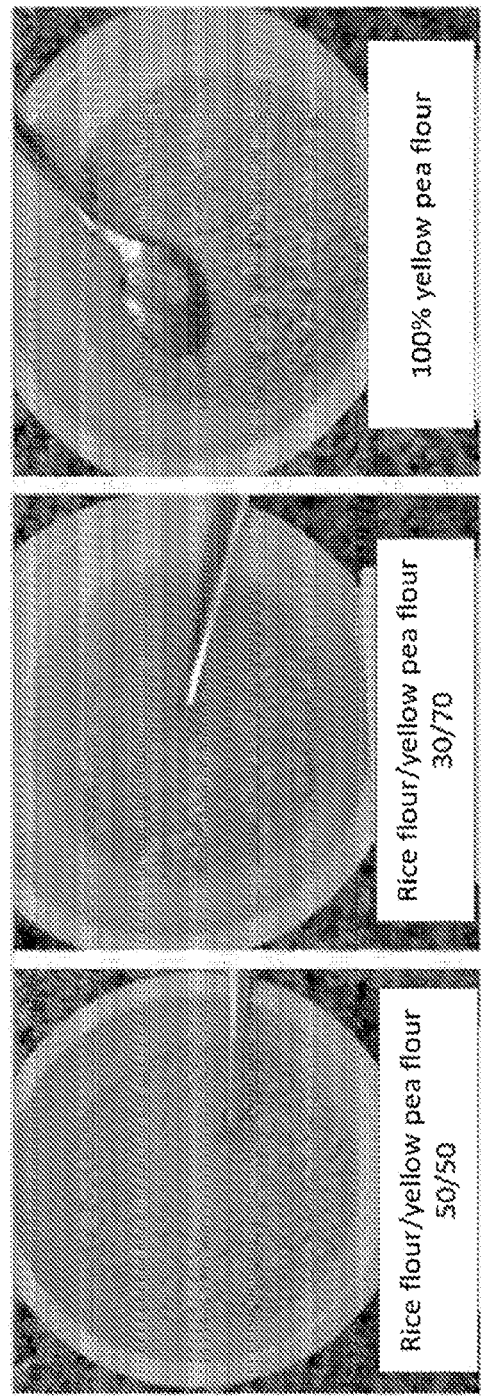
FIG. 1 is a photograph depicting reconstituted kernels including rice flour as a cereal component and yellow pea flour as a legume component in accordance with Example 5 of the present disclosure.

As used herein, the term "reconstituted kernel" refers to a kernel, as assessed after cooking, which has been formed from a mixture of ingredients by a shaping process, for example, by extrusion. The reconstituted kernels of the present disclosure are not naturally occurring kernels, although they may be composed of naturally occurring materials. Reconstituted kernels of the present disclosure may be of any shape. In some embodiments, reconstituted kernels of the present disclosure resemble or are substantially identical in appearance with, naturally occurring kernels, for example, natural grain kernels, such as milled rice kernels or milled wheat kernels. In some embodiments, the reconstituted kernels of the present disclosure resemble or are substantially identical in appearance with shapes not found in natural grain kernels, such as, for example, star shapes, annular shapes, alphabet shapes, animal shapes, pasta shapes (e.g., rigatoni, penne, farfalle), or any other shape known in the art.

As used herein, the term "about" when referring to a value or to an amount of mass, weight, time, volume, concentration or percentage is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed.

As used herein, the term "weight percentage (wt. %)" refers to the dry weight percentage of a component present in a reconstituted kernel of the present disclosure.

As used herein, the term "relative humidity" refers to the ratio of the partial pressure of water vapor to the equilibrium vapor pressure of water at the same temperature, and is expressed as a percentage. In some embodiments, a higher percentage of relative humidity indicates the air-water mixture is more humid.

As used herein, the term "amylose retrogradation" refers to recrystallization of amylose structure that transitions the amylose from a liquid state to a gel state.

As used herein, the terms "specific mechanical energy" and "SME" are used interchangeably and refer to a measure of the mechanical energy put into an extrudate during an extrusion process. In some embodiments, SME is the ratio of the net mechanical energy to the mass flow rate in an extrusion system.

Reconstituted Kernels

Certain aspects of the present disclosure relate to reconstituted kernel compositions having at least a cereal component and a legume component, where the reconstituted kernel composition has an amylose content sufficient to yield a reconstituted kernel composition with a desired texture as measure by cooking performance index (CPI), and to methods of making such reconstituted kernel compositions. In some embodiments, reconstituted kernel compositions of the present disclosure are comprised solely of the cereal component and the legume component (i.e., the reconstituted kernel compositions do not contain any further ingredients). In some embodiments, the amylose content in the reconstituted kernel compositions is solely provided by the cereal component, solely provided by the legume component, or solely provided by the mixture of the cereal component and the legume component. In certain embodiments, reconstituted kernel compositions of the present disclosure are dense food products rather than expanded air-filled food products.

In some embodiments, a reconstituted kernel composition of the present disclosure has an amylose content sufficient to yield a reconstituted kernel composition having any of a porridge-like, couscous-like, pasta-like, or rice-like texture. In some embodiments, a reconstituted kernel composition of the present disclosure has a porridge-like texture. In some embodiments, a reconstituted kernel composition of the present disclosure has a couscous-like texture. In some embodiments, a reconstituted kernel composition of the present disclosure has a pasta-like texture. In some embodiments, a reconstituted kernel composition of the present disclosure has a rice-like texture.

In some embodiments, a reconstituted kernel composition of the present disclosure has an amylose content sufficient to yield a reconstituted kernel composition having a cooking performance index of 1 to 5. In some embodiments, the CPI is 2 or more, 3 or more, or 4 or more. In some embodiments, the CPI is greater than 1, greater than 2, greater than 3 or greater than 4. In some embodiments, the CPI is less than 5, less than 4, less than 3, or less than 2. In some embodiments, the CPI is 4 or less, 3 or less, or 2 or less. In some embodiments, the CPI is 1, 2, 3, 4, or 5. In some embodiments, the CPI may be calculated, for example, by measuring the fraction of intact reconstituted kernels in the reconstituted kernel composition and/or the resistance of the reconstituted kernel composition to chewing, and then assigning a numerical value ranging from about 1 to about 5 based on the amount of intact reconstituted kernels in the reconstituted kernel composition and/or the resistance of the reconstituted kernel composition to chewing.

In some embodiments, a reconstituted kernel having a CPI of 1 is observed to have the following characteristics: complete or almost complete disintegration of kernel structure; often accompanied by significant levels of soccarat, and has a porridge like texture. In some embodiments a reconstituted kernel having a CPI of 2 is observed to have the following characteristics: a high incidence of broken kernels; a high level of kernel disintegration; the kernels have a soft bite; have high levels of leaching and/or severe erosion that makes the kernels sinter after cooling; are sticky to the hand; and are often accompanied by modest levels of soccarat. In some embodiments, a reconstituted kernel having a CPI of 3 is observed to have the following characteristics: Roughly equal distribution of intact and broken kernels; kernels have a medium bite; mouthfeel reveals discrete kernels; some leaching and/or erosion of kernels that causes the kernels to lump together but not sinter; does not absorb all water after being cooked, and the non-absorbed water may appear opaque and viscous; and is couscous like. In some embodiments, a reconstituted kernel having a CPI of 4 is observed to have the following characteristics: Kernels stay either intact or are fractured into a limited number of larger fragments; kernels have a firm bite; low levels of leaching and/or erosion of the kernels; any water not absorbed after cooking for 10 minutes is substantially clear, and is pasta like. In some embodiments, a reconstituted kernel with a CPI of 5 is observed to have the following characteristics: kernels stay intact; kernels have a very firm bite, a springy bite, and/or an al dente bite; none or very low levels of leaching and/or erosion of the kernels; any water not absorbed after cooking for 10 minutes is clear; and is rice like.

Mixtures

In some embodiments, a reconstituted kernel composition of the present disclosure includes a mixture of a cereal component and a legume component. In some embodiments, the mixture does not include any additional components. In some embodiments, the mixture may further include an amylose starch component. In some embodiments, the mixture may further include an additive/supplement component. In some embodiments, the mixture may further include an emulsifier component.

Cereal Component

In some embodiments, the cereal component of a reconstituted kernel composition of the present disclosure may include any suitable cereal or combination of cereals, and the cereal or combination of cereals may be in any suitable form known in the art, for example as a whole grain or mixture of grains, as a cracked grain, as a husked grain, as a bran, milled into a flour (including meals, groats, and pellets), as separated components (including cereal starch, cereal protein, and cereal fat/oil), or any combination thereof.

In some embodiments, a cereal may be any grain used for food. For example, a cereal may be a grain from any plant of the grass family yielding an edible grain. Additionally, a cereal may be a pseudograin from any plant of the broadleaf family yielding an edible pseudograin.

Examples of suitable cereals may include one or more of rice, teff, sorghum, yellow corn, white corn, millet, finger millet, fonio, foxtail millet, Japanese millet, Job's tears, Kodo millet, pearl millet, proso millet, barley, oats, rye, spelt, triticale, wheat, wild rice, and any combination thereof. In some embodiments, the cereal component may contain one or more, two or more, three or more, four or more, or five or more cereals.

In some embodiments, a cereal component of the present disclosure may be any suitable pseudocereal or combination of pseudocereals, and the pseudocereal or combination of pseudocereals may be in any suitable form known in the art, for example as a whole pseudograin or mixture of pseudograins, as a cracked pseudograin, as a husked pseudograin, as a bran, milled into a flour (including meals, groats, and pellets), and as separated components (including pseudocereal starch, pseudocereal protein, and pseudocereal fat/oil). Examples of suitable pseudocereals may include one or more of amaranth, buckwheat, chia, quinoa, and any combination thereof. In some embodiments, the cereal component contains one or more, two or more, three of more, four or more, or five or more pseudocereals.

In some embodiments, a cereal component of the present disclosure may include a combination of two or more, three or more, four or more, five or more, six or more, seven or more, eight or more, nine or more, or 10 or more cereals and/or pseudocereals in any combination.

In some embodiments, a cereal component of the present disclosure may include a cereal flour or any combination of cereal flours. In some embodiments, the cereal component may include one or more of rice flour, teff flour, sorghum flour, yellow corn flour, white corn flour, millet flour, finger millet flour, fonio flour, foxtail millet flour, Japanese millet flour, Job's tears flour, Kodo millet flour, pearl millet flour, proso millet flour, barley flour, oat flour, rye flour, spelt flour, triticale flour, wheat flour, wild rice flour, amaranth flour, buckwheat flour, chia flour, quinoa flour, and any combination thereof. In some embodiments, the cereal component may contain one or more, two or more, three or more, four or more, or five or more cereal flours and/or pseudocereal flours.

In certain embodiments, the cereal component may contain a combination of two, three, four, five, or more than five cereal flours and pseudocereal flours in any combination.

In some embodiments, a reconstituted kernel composition of the present disclosure has between about 5 wt. % and about 60 wt. % cereal component. In some embodiments, the reconstituted kernel composition has less than about 60 wt. %, 55 wt. %, 50 wt. %, 45 wt. %, 40 wt. %, 35 wt. %, 30 wt. %, 25 wt. %, 20 wt. %, 15 wt. %, or 10 wt. % cereal component. In some embodiments, the reconstituted kernel composition has greater than about 5 wt. %, 10 wt. %, 15 wt. %, 20 wt. %, 25 wt. %, 30 wt. %, 35 wt. %, 40 wt. %, 45 wt. %, 50 wt. %, or 55 wt. % cereal component. In some embodiments, the cereal component in the reconstituted kernel composition can be any of a range of wt. % having an upper limit of about 60 wt. %, 55 wt. %, 50 wt. %, 45 wt. %, 40 wt. %, 35 wt. %, 30 wt. %, 25 wt. %, 20 wt. %, 15 wt. %, or 10 wt. %, and an independently selected lower limit of about 5 wt. %, 10 wt. %, 15 wt. %, 20 wt. %, 25 wt. %, 30 wt. %, 35 wt. %, 40 wt. %, 45 wt. %, 50 wt. %, or 55 wt. %, where the lower limit is less than the upper limit. In some embodiments, the reconstituted kernel composition has between about 15 wt. % and about 50 wt. % cereal component. In some embodiments, the reconstituted kernel composition has between about 15 wt. % and about 45 wt. % cereal component. In some embodiments, the reconstituted kernel composition has between about 15 wt. % and about 40 wt. % cereal component. In some embodiments, the reconstituted kernel composition has between about 15 wt. % and about 35 wt. % cereal component. In some embodiments, the reconstituted kernel composition has between about 15 wt. % and about 30 wt. % cereal component. In some embodiments, the reconstituted kernel composition has between about 15 wt. % and about 25 wt. % cereal component. In some embodiments, the reconstituted kernel composition has between about 15 wt. % and about 20 wt. % cereal component. In some embodiments, the reconstituted kernel composition has between about 20 wt. % and about 50 wt. % cereal component. In some embodiments, the reconstituted kernel composition has between about 25 wt. % and about 50 wt. % cereal component. In some embodiments, the reconstituted kernel composition has between about 30 wt. % and about 50 wt. % cereal component. In some embodiments, the reconstituted kernel composition has between about 35 wt. % and about 50 wt. % cereal component. In some embodiments, the reconstituted kernel composition has between about 40 wt. % and about 50 wt. % cereal component. In some embodiments, the reconstituted kernel composition has between about 45 wt. % and about 50 wt. % cereal component. In some embodiments, the reconstituted kernel composition has about 15 wt. % cereal component. In some embodiments, the reconstituted kernel composition has about 20 wt. % cereal component. In some embodiments, the reconstituted kernel composition has about 25 wt. % cereal component. In some embodiments, the reconstituted kernel composition has about 30 wt. % cereal component. In some embodiments, the reconstituted kernel composition has about 35 wt. % cereal component. In some embodiments, the reconstituted kernel composition has about 40 wt. % cereal component. In some embodiments, the reconstituted kernel composition has about 45 wt. % cereal component. In some embodiments, the reconstituted kernel composition has about 50 wt. % cereal component.

Legume Component

In some embodiments, the legume component of a reconstituted kernel composition of the present disclosure may include any suitable legume or combination of legumes, and the legume or combination of legumes may be in any suitable form known in the art, for example as a whole legume, as a split legume, dried legumes, milled into a flour, as separated components (including legume starch, legume protein, and legume fat/oil), or any combination thereof.

In some embodiments, a legume may be the pod or seed of any variety of plants having pods that contain seeds.

Examples of suitable legumes may include one or more of red lentils, green lentils, brown lentils, chickpeas, yellow peas, fava beans, tepary beans, runner beans, lima beans, pinto beans, kidney beans, black beans, green beans, moth beans, adzuki beans, urad beans, mung beans, ricebeans, cowpeas, Indian peas, hyacinth beans, soybeans, winged beans, pigeon peas, velvet beans, jack beans, guar, sword beans, horse gram, tarwi, lupine beans, and peanuts. In some embodiments, the legume component may contain one or more, two or more, three or more, four or more, or five or more legumes.

In some embodiments, the legume component of the present disclosure may include a legume flour or any combination of legume flours. In some embodiments, the legume component may include one or more of red lentil flour, green lentil flour, brown lentil flour, chickpea flour, yellow pea flour, fava bean flour, tepary bean flour, runner bean flour, lima bean flour, pinto bean flour, kidney bean flour, black bean flour, green bean flour, moth bean flour, adzuki bean flour, urad bean flour, mung bean flour, ricebean flour, cowpea flour, Indian pea flour, hyacinth bean flour, soybean flour, winged bean flour, pigeon pea flour, velvet bean flour, jack bean flour, guar flour, sword bean flour, horse gram flour, tarwi flour, lupine bean flour, and peanut flour. In some embodiments, the legume component may contain one or more, two or more, three or more, four or more, or five or more legume flours.

In some embodiments, a reconstituted kernel composition of the present disclosure is present has between 40 wt. % and 95 wt. % legume component. In some embodiments, a reconstituted kernel composition of the present disclosure is present has less than about 95 wt. %, 90 wt. %, 85 wt. %, 80 wt. %, 75 wt. %, 70 wt. %, 65 wt. %, 60 wt. %, 55 wt. %, 50 wt. %, or 45 wt. % legume component. In some embodiments, a reconstituted kernel composition of the present disclosure is present has greater than about 40 wt. %, 45 wt. %, 50 wt. %, 55 wt. %, 60 wt. %, 65 wt. %, 70 wt. %, 75 wt. %, 80 wt. %, 85 wt. %, or 90 wt. % legume component. In some embodiments, the legume component in the reconstituted kernel composition can be any of a range of wt. % having an upper limit of about 95 wt. %, 90 wt. %, 85 wt. %, 80 wt. %, 75 wt. %, 70 wt. %, 65 wt. %, 60 wt. %, 55 wt. %, 50 wt. %, or 45 wt. % and an independently selected lower limit of about 40 wt. %, 45 wt. %, 50 wt. %, 55 wt. %, 60 wt. %, 65 wt. %, 70 wt. %, 75 wt. %, 80 wt. %, 85 wt. %, or 90 wt. %, where the lower limit is less than the upper limit. In some embodiments, the reconstituted kernel composition has between about 50 wt. % and about 85 wt. % legume component. In some embodiments, the reconstituted kernel composition has between about 50 wt. % and about 80 wt. % legume component. In some embodiments, the reconstituted kernel composition has between about 50 wt. % and about 75 wt. % legume component. In some embodiments, the reconstituted kernel composition has between about 50 wt. % and about 70 wt. % legume component. In some embodiments, the reconstituted kernel composition has between about 50 wt. % and about 65 wt. % legume component. In some embodiments, the reconstituted kernel composition has between about 50 wt. % and about 60 wt. % legume component. In some embodiments, the reconstituted kernel composition has between about 50 wt. % and about 55 wt. % legume component. In some embodiments, the reconstituted kernel composition has between about 55 wt. % and about 85 wt. % legume component. In some embodiments, the reconstituted kernel composition has between about 60 wt. % and about 85 wt. % legume component. In some embodiments, the reconstituted kernel composition has between about 65 wt. % and about 85 wt. % legume component. In some embodiments, the reconstituted kernel composition has between about 70 wt. % and about 85 wt. % legume component. In some embodiments, the reconstituted kernel composition has between about 75 wt. % and about 85 wt. % legume component. In some embodiments, the reconstituted kernel composition has between about 80 wt. % and about 85 wt. % legume component. In some embodiments, the reconstituted kernel composition has of about 50 wt. % legume component. In some embodiments, the reconstituted kernel composition has about 55 wt. % legume component. In some embodiments, the reconstituted kernel composition has about 60 wt. % legume component. In some embodiments, the reconstituted kernel composition has about 65 wt. % legume component. In some embodiments, the reconstituted kernel composition has about 70 wt. % legume component. In some embodiments, the reconstituted kernel composition has about 75 wt. % legume component. In some embodiments, the reconstituted kernel composition has about 80 wt. % legume component. In some embodiments, the reconstituted kernel composition has about 85 wt. % legume component.

In some embodiments, a reconstituted kernel composition of the present disclosure may contain a cereal component and a legume component in any wt. % described herein. In some embodiments, a reconstituted kernel composition of the present disclosure includes a mixture of a cereal component and a legume component, where the weight by weight ratio of cereal component to legume component is 50:50. In some embodiments, a reconstituted kernel composition of the present disclosure includes a mixture of a cereal component and a legume component, where the weight by weight ratio of cereal component to legume component is 40:60. In some embodiments, a reconstituted kernel composition of the present disclosure includes a mixture of a cereal component and a legume component, where the weight by weight ratio of cereal component to legume component is 30:70. In some embodiments, a reconstituted kernel composition of the present disclosure includes a mixture of a cereal component and a legume component, where the weight by weight ratio of cereal component to legume component is 20:80. In some embodiments, a reconstituted kernel composition of the present disclosure includes a mixture of a cereal component and a legume component, where the weight by weight ratio of cereal component to legume component is 15:80.

Amylose Content

In some embodiments, reconstituted kernel compositions of the present disclosure include an amylose content sufficient to yield a reconstituted composition having a desired texture, such as a pasta-like texture, a rice-like texture, etc. In some embodiments, the amylose content in the reconstituted kernel compositions is solely provided by the cereal component, solely provided by the legume component, or solely provided by the mixture of the cereal component and the legume component. In some embodiments, the amylose content in the reconstituted kernel compositions is achieved solely by the mixture of the cereal component and the legume component, without the addition of any additional components that contain amylose starch. Alternatively, the amylose content sufficient to yield a reconstituted composition having a desired texture may be achieved by the further addition of one or more additional components that contain amylose starch (e.g., addition of an amylose starch containing component).

It is believed that the complex behavior of starch in a composition is related to the physical and chemical properties of the starch components amylopectin and amylose. In some embodiments, starch may be structured into granules of various shapes and sizes dictated by the biological source of the starch, and that a significant fraction of the amylopectin component of starch is in a crystalline form. In some embodiments, exposure of starch to specific temperatures, while controlling the water content of a mixture, may cause the starch in the mixture to undergo several irreversible transitions that include the gelatinization of the starch granules and the melting of starch crystallites. In some embodiments, the complex reorganization of the starch components during this process, including the retrogradation of amylose, may impact several important properties and/or qualities of a food product. In some embodiments, controlling the amylose content of a food product, like a reconstituted kernel composition of the present disclosure, may have a significant impact on the qualities of the product, including, but not limited to, affecting the texture of the product.

Accordingly, in some embodiments, reconstituted kernel compositions of the present disclosure contain an amylose content at a level sufficient to give the reconstituted kernel composition a desired texture. In some embodiments, a reconstituted kernel composition of the present disclosure has about 8 wt. % or greater amylose content. In some embodiments, the reconstituted kernel composition has less than about 50 wt. % 45 wt. %, 40 wt. %, 35 wt. %, 30 wt. %, 29 wt. %, 28 wt. %, 27 wt. %, 26 wt. %, 25 wt. %, 24 wt. %, 23 wt. %, 22 wt. %, 21 wt. %, 20 wt. %, 19 wt. %, 18 wt. %, 17 wt. %, 16 wt. %, 15 wt. %, 14 wt. %, 13 wt. %, 12 wt. %, 11 wt. %, 10 wt. %, or 9 wt. % amylose content. In some embodiments, the reconstituted kernel composition has greater than about 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 35 wt. %, 40 wt. %, or 45 wt. % amylose content. In some embodiments, the amylose content of the reconstituted kernel composition can be any of a range of wt. % having an upper limit of about 50 wt. %, 45 wt. %, 40 wt. % 35 wt. %, 30 wt. % 29 wt. % 28 wt. % 27 wt. % 26 wt. % 25 wt. % 24 wt. % 23 wt. % 22 wt. % 21 wt. % 20 wt. % 19 wt. % 18 wt. %, 17 wt. %, 16 wt. %, 15 wt. %, 14 wt. %, 13 wt. %, 12 wt. %, 11 wt. %, 10 wt. %, or 9 wt. % and an independently selected lower limit of 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. % 25 wt. %, 26 wt. %, 27 wt. %, 28 wt. %, 29 wt. %, 30 wt. %, 35 wt. %, 40 wt. %, or 45 wt. % where the lower limit is less than the upper limit. In some embodiments, the reconstituted kernel composition has between about 9 wt. % and 50 wt. % amylose content. In some embodiments, the reconstituted kernel composition has between about 9 wt. % and 40 wt. % amylose content. In some embodiments, the reconstituted kernel composition has between about 9 wt. % and about 30 wt. % amylose content. In some embodiments, the reconstituted kernel composition has between about 9 wt. % and about 25 wt. % amylose content. In some embodiments, the reconstituted kernel composition has between about 9 wt. % and about 20 wt. % amylose content. In some embodiments, the reconstituted kernel composition has between about 9 wt. % and about 17 wt. % amylose content. In some embodiments, the reconstituted kernel composition has between about 10 wt. % and about 50 wt. % amylose content. In some embodiments, the reconstituted kernel composition has between about 10 wt. % and about 40 wt. % amylose content. In some embodiments, the reconstituted kernel composition has between about 10 wt. % and about 30 wt. % amylose content. In some embodiments, the reconstituted kernel composition has between about 10 wt. % and about 25 wt. % amylose content. In some embodiments, the reconstituted kernel composition has between about 10 wt. % and about 20 wt. % amylose content. In some embodiments, the reconstituted kernel composition has between about 10 wt. % and about 17 wt. % amylose content. In some embodiments, the reconstituted kernel composition has about 9 wt. % amylose content. In some embodiments, the reconstituted kernel composition has about 10 wt. % amylose content. In some embodiments, the reconstituted kernel composition has about 11 wt. % amylose content. In some embodiments, the reconstituted kernel composition has about 12 wt. % amylose content. In some embodiments, the reconstituted kernel composition has about 13 wt. % amylose content. In some embodiments, the reconstituted kernel composition has about 14 wt. % amylose content. In some embodiments, the reconstituted kernel composition has about 15 wt. % amylose content. In some embodiments, the reconstituted kernel composition has about 16 wt. % amylose content. In some embodiments, the reconstituted kernel composition has about 17 wt. % amylose content. In some embodiments, the reconstituted kernel composition has about 18 wt. % amylose content. In some embodiments, the reconstituted kernel composition has about 19 wt. % amylose content. In some embodiments, the reconstituted kernel composition has about 20 wt. % amylose content.

Amylose Starch Component

In some embodiments, a reconstituted kernel composition of the present disclosure may further include an amylose starch component. In some embodiments, an amylose starch component of the present disclosure may include any suitable amylose starch or a combination of amylose starches. Alternatively, a reconstituted kernel composition of the present disclosure may exclude (i.e., not include) an amylose starch component.

In some embodiments, an amylose starch may be a product that contains an amylose starch, but that may not be entirely composed of amylose starch. In some embodiments, the amylose starch is an unmodified amylose starch. In other embodiments, the amylose starch is not pregelatinized.

Examples of suitable amylose starches may include one or more of corn starch, high amylose corn starch, and rice starch. In some embodiments, the amylose starch component may contain one or more, two or more, three or more, four or more, or five or more amylose starches.

In some embodiments, a reconstituted kernel composition of the present disclosure has between about 0.1 wt. % and about 50 wt. % amylose starch component. In some embodiments, the reconstituted kernel composition of the present disclosure has less than about 50 wt. %, 45 wt. %, 40 wt. %, 35 wt. %, 30 wt. %, 25 wt. %, 20 wt. %, 15 wt. %, 10 wt. %, or 5 wt. % amylose starch component. In some embodiments, the reconstituted kernel composition of the present disclosure has greater than about 0.1 wt. %, 5 wt. %, 10 wt. %, 15 wt. %, 20 wt. %, 25 wt. %, 30 wt. %, 35 wt. %, 40 wt. %, or 45 wt. % amylose starch component. In some embodiments, the amylose starch component in the reconstituted kernel composition can be any of a range of wt. % having an upper limit of about 50 wt. %, 45 wt. %, 40 wt. %, 35 wt. %, 30 wt. %, 25 wt. %, 20 wt. %, 15 wt. %, 10 wt. %, or 5 wt. % and an independently selected lower limit of about 0.1 wt. %, 5 wt. %, 10 wt. %, 15 wt. %, 20 wt. %, 25 wt. %, 30 wt. %, 35 wt. %, 40 wt. %, or 45 wt. %, where the lower limit is less than the upper limit. In some embodiments, the reconstituted kernel composition has between about 5 wt. % and about 50 wt. % amylose starch component. In some embodiments, the reconstituted kernel composition has between about 10 wt. % and about 50 wt. % amylose starch component. In some embodiments, the reconstituted kernel composition has between about 15 wt. % and about 50 wt. % amylose starch component. In some embodiments, the reconstituted kernel composition has between about 20 wt. % and about 50 wt. % amylose starch component. In some embodiments, the reconstituted kernel composition has between about 25 wt. % and about 50 wt. % amylose starch component. In some embodiments, the reconstituted kernel composition has between about 30 wt. % and about 50 wt. % amylose starch component. In some embodiments, the reconstituted kernel composition has between about 35 wt. % and about 50 wt. % amylose starch component. In some embodiments, the reconstituted kernel composition has between about 40 wt. % and about 50 wt. % amylose starch component. In some embodiments, the reconstituted kernel composition has between about 45 wt. % and about 50 wt. % amylose starch component. In some embodiments, the reconstituted kernel composition has between about 5 wt. % and about 45 wt. % amylose starch component. In some embodiments, the reconstituted kernel composition has between about 5 wt. % and about 40 wt. % amylose starch component. In some embodiments, the reconstituted kernel composition has between about 5 wt. % and about 35 wt. % amylose starch component. In some embodiments, the reconstituted kernel composition has between about 5 wt. % and about 30 wt. % amylose starch component. In some embodiments, the reconstituted kernel composition has between about 5 wt. % and about 25 wt. % amylose starch component. In some embodiments, the reconstituted kernel composition has between about 5 wt. % and about 20 wt. % amylose starch component. In some embodiments, the reconstituted kernel composition has between about 5 wt. % and about 15 wt. % amylose starch component. In some embodiments, the reconstituted kernel composition has between about 5 wt. % and about 10 wt. % amylose starch component. In some embodiments, the reconstituted kernel composition has about 0.1 wt. % amylose starch component. In some embodiments, the reconstituted kernel composition has about 5 wt. % amylose starch component. In some embodiments, the reconstituted kernel composition has about 10 wt. % amylose starch component. In some embodiments, the reconstituted kernel composition has about 15 wt. % amylose starch component. In some embodiments, the reconstituted kernel composition has about 20 wt. % amylose starch component. In some embodiments, the reconstituted kernel composition has about 25 wt. % amylose starch component. In some embodiments, the reconstituted kernel composition has about 30 wt. % amylose starch component. In some embodiments, the reconstituted kernel composition has about 35 wt. % amylose starch component. In some embodiments, the reconstituted kernel composition has about 40 wt. % amylose starch component. In some embodiments, the reconstituted kernel composition has about 45 wt. % amylose starch component. In some embodiments, the reconstituted kernel composition has about 50 wt. % amylose starch component.

Emulsifier Component

In some embodiments, a reconstituted kernel composition of the present disclosure may further include an emulsifier component. In some embodiments, an emulsifier component of the present disclosure may include any suitable emulsifier or combination of emulsifiers. Alternatively, a reconstituted kernel composition of the present disclosure may exclude (i.e., not include) an emulsifier component.

In some embodiments, an emulsifier may be a substance that forms or preserves an emulsion by increasing the compatibility of the contact surfaces of two components in a blend.

Examples of suitable emulsifiers may include one or more of phospholipids, enzyme digested lecithin, enzyme-treated lecithin, glycerin fatty acid esters, monoglycerides, acetic acid esters of monoglycerides, lactic acid esters of monoglycerides, citric acid esters of monoglycerides, succinic acid esters of monoglycerides, diacetyl tartaric acid esters of monoglycerides, polyglycerol esters of fatty acids, polyglycerol polyricinoleate, sorbitan esters of fatty acids, propylene glycol esters of fatty acids, sucrose esters of fatty acids, and calcium stearoyl di lactate. In some embodiment, the monoglycerides may be distilled monoglycerides. In some embodiments, the monoglycerides may be distilled monoglycerides sold under the trade name "DIMODAN®," which is commercially available from DuPont Nutrition and Health. In some embodiments, the emulsifier component may contain one or more, two or more, three or more, four or more, or five or more emulsifiers.

In some embodiments, a reconstituted kernel composition of the present disclosure has about 0.6 wt. % or less emulsifier component. In some embodiments, the reconstituted kernel composition has between about 0 wt. % and about 0.95 wt. % emulsifier component. In some embodiments, the reconstituted kernel composition has less than about 0.95 wt. %, 0.90 wt. %, 0.85 wt. % 0.80 wt. % 0.75 wt. % 0.70 wt. % 0.65 wt. % 0.60 wt. % 0.55 wt. % 0.50 wt. %, 0.45 wt. % 0.40 wt. %, 0.35 wt. % 0.30 wt. %, 0.25 wt. % 0.20 wt. %, 0.15 wt. % 0.10 wt. %, 0.05 wt. % or 0.01 wt. % emulsifier component. In some embodiments, the reconstituted kernel composition has greater than about 0 wt. %, 0.01 wt. %, 0.05 wt. %, 0.10 wt. %, 0.15 wt. %, 0.20 wt. %, 0.25 wt. %, 0.30 wt. %, 0.35 wt. %, 0.40 wt. %, 0.45 wt. %, 0.50 wt. %, 0.55 wt. %, 0.60 wt. %, 0.65 wt. %, 0.70 wt. %, 0.75 wt. %, 0.80 wt. %, 0.85 wt. %, or 0.90 wt. % emulsifier component. In some embodiments, the emulsifier component in the reconstituted kernel composition can be any of a range of wt. % having an upper limit of about 0.95 wt. %, 0.90 wt. %, 0.85 wt. %, 0.80 wt. %, 0.75 wt. %, 0.70 wt. %, 0.65 wt. %, 0.60 wt. %, 0.55 wt. %, 0.50 wt. %, 0.45 wt. %, 0.40 wt. %, 0.35 wt. %, 0.30 wt. %, 0.25 wt. %, 0.20 wt. %, 0.15 wt. %, 0.10 wt. %, 0.05 wt. %, or 0.01 wt. %, and an independently selected lower limit of about 0 wt. %, 0.01 wt. %, 0.05 wt. %, 0.10 wt. %, 0.15 wt. %, 0.20 wt. %, 0.25 wt. %, 0.30 wt. %, 0.35 wt. %, 0.40 wt. %, 0.45 wt. %, 0.50 wt. %, 0.55 wt. %, 0.60 wt. %, 0.65 wt. %, 0.70 wt. %, 0.75 wt. %, 0.80 wt. %, 0.85 wt. %, or 0.90 wt. %, where the lower limit is less than the upper limit. In some embodiments, the reconstituted kernel composition has between about 0 wt. % and about 0.5 wt. % emulsifier component. In some embodiments, the reconstituted kernel composition has between about 0 wt. % and about 0.4 wt. % emulsifier component. In some embodiments, the reconstituted kernel composition has between about 0 wt. % and about 0.3 wt. % emulsifier component. In some embodiments, the reconstituted kernel composition has between about 0 wt. % and about 0.2 wt. % emulsifier component. In some embodiments, the reconstituted kernel composition has between about 0 wt. % and about 0.1 wt. % emulsifier component. In some embodiments, the reconstituted kernel composition has between about 0 wt. % and about 0.05 wt. % emulsifier component. In some embodiments, the emulsifier component in the reconstituted kernel composition is present in an amount between about 0 wt. % and about 0.01 wt. % emulsifier component. In some embodiments, the reconstituted kernel composition has between about 0.01 wt. % and about 0.5 wt. % emulsifier component. In some embodiments, the reconstituted kernel composition has between about 0.05 wt. % and about 0.5 wt. % emulsifier component. In some embodiments, the reconstituted kernel composition has between about 0.1 wt. % and about 0.5 wt. % emulsifier component. In some embodiments, the reconstituted kernel composition has between about 0.2 wt. % and about 0.5 wt. % emulsifier component. In some embodiments, the reconstituted kernel composition has between about 0.3 wt. % and about 0.5 wt. % emulsifier component. In some embodiments, the reconstituted kernel composition has between about 0.4 wt. % and about 0.5 wt. % emulsifier component. In some embodiments, the emulsifier component in the reconstituted kernel composition is present in an amount less than about 0.6 wt. % emulsifier component. In some embodiments, the reconstituted kernel composition has about 0.5 wt. % emulsifier component. In some embodiments, the reconstituted kernel composition has about 0.4 wt. % emulsifier component. In some embodiments, the reconstituted kernel composition has about 0.3 wt. % emulsifier component. In some embodiments, the reconstituted kernel composition has about 0.2 wt. % emulsifier component. In some embodiments, the reconstituted kernel composition has about 0.1 wt. % emulsifier component. In some embodiments, the reconstituted kernel composition has about 0.05 wt. % emulsifier component. In some embodiments, the reconstituted kernel composition has about 1.1 wt. % emulsifier component. In some embodiments, the reconstituted kernel composition contains no emulsifier component.

Additive/Supplement Component

In certain embodiments, a reconstituted kernel composition of the present disclosure may further include an additive/supplement component. The additive/supplement component may include one or more suitable additives and/or supplements, or any combination of additives and supplements. In certain embodiments, the one or more additives and/or supplements may include additional micronutrients (for example, folate and iron), supplemented protein, coloring agents or dyes, vitamins, minerals, sweeteners, flavorings, and any other suitable ingredients. In some embodiments, a reconstituted kernel composition of the present disclosure does not include any sweeteners or sweetening compositions. For example, in some embodiments, a reconstituted kernel composition of the present disclosure does not include added sugars, such as sucrose or crystalline fructose, syrups such as corn syrup high fructose corn syrup, inver syrup (a combination of dextrose and fructose), and malt syrup, fruit concentrates such as apple juice, pear juice, and white grape juice, and/or artificial sweeteners, such as aspartame.

In some embodiments, the ranges provided herein for the legume component and cereal component may add up to 100 wt. % of a reconstituted kernel composition of the present disclosure. In some embodiments, the ranges provided herein for the legume component and cereal component may add up to less than 100 wt. % of a reconstituted kernel composition of the present disclosure. In some embodiments, when the legume component and cereal component do not add up to 100 wt. % of a reconstituted kernel composition of the present disclosure, the additional wt. % may be provided by the addition of an emulsifier component, an amylose starch component, an additive/supplement component, or any combination thereof. For example, in some embodiments, a reconstituted kernel composition of the present disclosure includes a mixture of a cereal component, a legume component, an amylose starch component, and an emulsifier component, where the weight by weight ratio of cereal component to legume component to amylose starch component to emulsifier component is 15:80:4:1.

Texture

A reconstituted kernel composition of the present disclosure includes at least a cereal component and a legume component, where the reconstituted kernel composition has an amylose content sufficient to yield a reconstituted kernel composition with a desired texture. In some embodiments, the reconstituted kernel composition is a dense (e.g., pasta-like) product. That is, in some embodiments, the reconstituted kernel composition is not an expanded, air-filled product. In some embodiments, a reconstituted kernel composition of the present disclosure has an amylose content sufficient to yield a reconstituted kernel composition having any of a porridge-like, couscous-like, pasta-like, or rice-like texture. In some embodiments, a reconstituted kernel composition of the present disclosure may have a porridge-like texture. In some embodiments, a reconstituted kernel composition of the present disclosure may have a couscous-like texture. In some embodiments, a reconstituted kernel composition of the present disclosure may have a pasta-like texture. In some embodiments, a reconstituted kernel composition of the present disclosure may have a rice-like texture. In some embodiments, a reconstituted kernel composition of the present disclosure excludes (i.e., does not include) any added texturizers and/or hydrocolloids.

In some embodiments, a reconstituted kernel composition of the present disclosure has an amylose content sufficient to yield a reconstituted kernel composition having a cooking performance index of 1 to 5. In some embodiments, the CPI is 2 or more, 3 or more, or 4 or more. In some embodiments, the CPI is greater than 1, greater than 2, greater than 3 or greater than 4. In some embodiments, the CPI is less than 5, less than 4, less than 3, or less than 2. In some embodiments, the CPI is 4 or less, 3 or less, or 2 or less. In some embodiments, the CPI is 1, 2, 3, 4, or 5.

In some embodiments, the CPI is calculated by measuring the fraction of intact reconstituted kernels in the reconstituted kernel composition and/or the resistance of the reconstituted kernel composition to chewing, and then assigning a numerical value that ranges from about 1 to about 5 based on the amount of intact kernels in the reconstituted kernel composition and/or the resistance of the reconstituted kernel composition to chewing.

In some embodiments, a reconstituted kernel composition of the present disclosure has a CPI of about 1. In some embodiments, the reconstituted kernel composition having a CPI of about 1 includes a complete or almost complete disintegration of the kernel structure. In some embodiments, the reconstituted kernel composition having a CPI of about 1 has a porridge-like texture. In some embodiments, the reconstituted kernel composition having a CPI of about 1 has significant levels of soccarat.

In some embodiments, a reconstituted kernel composition of the present disclosure has a CPI of about 2. In some embodiments, the reconstituted kernel composition having a CPI of about 2 has a high incidence of broken kernels. In some embodiments, the reconstituted kernel composition having a CPI of about 2 has a high level of kernel disintegration. In some embodiments, the reconstituted kernel composition having a CPI of about 2 has a soft bite of remaining kernels. In some embodiments, the reconstituted kernel composition having a CPI of about 2 has a high level of leaching and/or severe erosion of the kernels that cause the kernels to sinter. In some embodiments, the reconstituted kernel composition having a CPI of about 2 is sticky to the touch. In some embodiments, the reconstituted kernel composition having a CPI of about 2 has modest levels of soccarat. In some embodiments, the reconstituted kernel composition having a CPI of about 2 has a high incidence of broken kernels, a high level of kernel disintegration, and a soft bite of remaining kernels.

In some embodiments, a reconstituted kernel composition of the present disclosure has a CPI of about 3. In some embodiments, the reconstituted kernel composition having a CPI of about 3 has a roughly equal distribution of intact and broken kernels. In some embodiments, the reconstituted kernel composition having a CPI of about 3 has a medium bite. In some embodiments, the reconstituted kernel composition having a CPI of about 3 has a couscous-like texture. In some embodiments, the reconstituted kernel composition having a CPI of about 3 has a mouthfeel revealing discrete kernels. In some embodiments, the reconstituted kernel composition having a CPI of about 3 has some leaching and/or erosion of the kernels that cause the kernels to lump together but not sinter. In some embodiments, the reconstituted kernel composition having a CPI of about 3 does not absorb all of the water in which it is cooked. In some embodiments, the non-absorbed water appears opaque and/or viscous. In some embodiments, the reconstituted kernel composition having a CPI of about 3 has a roughly equal distribution of intact and broken kernels, and a medium bite.

In some embodiments, a reconstituted kernel composition of the present disclosure has a CPI of about 4. In some embodiments, the reconstituted kernel composition having a CPI of about 4 has intact kernels or kernels that have fractured into large fragments. In some embodiments, the reconstituted kernel composition having a CPI of about 4 has a firm bite. In some embodiments, the reconstituted kernel composition having a CPI of about 4 has a pasta-like texture. In some embodiments, the reconstituted kernel composition having a CPI of about 4 has low levels of leaching and/or erosion of the kernels. In some embodiments, the reconstituted kernel composition having a CPI of about 4 does not absorb all of the water in which it is cooked after 10 minutes of cooking. In some embodiments, the non-absorbed water appears substantially clear. In some embodiments, the reconstituted kernel composition having a CPI of about 4 has intact kernels or kernels that have fractured into large fragments, and a firm bite.

In some embodiments, a reconstituted kernel composition of the present disclosure has a CPI of about 5. In some embodiments, the reconstituted kernel composition having a CPI of about 5 has intact kernels. In some embodiments, the reconstituted kernel composition having a CPI of about 5 has a very firm bite, a springy bite, and/or an al dente bite. In some embodiments, the reconstituted kernel composition having a CPI of about 5 has a rice-like texture. In some embodiments, the reconstituted kernel composition having a CPI of about 5 has very low levels of leaching and/or erosion of the kernels. In some embodiments, the reconstituted kernel composition having a CPI of about 5 does not absorb all of the water in which it is cooked after 10 minutes of cooking. In some embodiments, the non-absorbed water appears clear or essentially clear. In some embodiments, the reconstituted kernel composition having a CPI of about 5 has intact kernels, and a very firm bite.

Water Content

In some embodiments, a reconstituted kernel composition of the present disclosure has less than about 40 wt. %, 35 wt. %, 30 wt. %, 25 wt. %, or 20 wt. % total water content. In some embodiments, the reconstituted kernel composition has greater than about 15 wt. %, 20 wt. %, 25 wt. %, 30 wt. %, or 35 wt. % total water content. In some embodiments, a reconstituted kernel composition of the present disclosure has a water content that is present in an amount that can be any of a range of wt. % having an upper limit of 40 wt. %, 35 wt. %, 30 wt. %, 25 wt. %, or 20 wt. % and an independently selected lower limit of 15 wt. %, 20 wt. %, 25 wt. %, 30 wt. %, or 35 wt. %, where the lower limit is less than the upper limit. In some embodiments, the reconstituted kernel composition has between 15 wt. % and 40 wt. % total water content. In some embodiments, the reconstituted kernel composition has between 15 wt. % and 35 wt. % total water content. In some embodiments, the reconstituted kernel composition has between 15 wt. % and 30 wt. % total water content. In some embodiments, the reconstituted kernel composition has between 15 wt. % and 25 wt. % total water content. In some embodiments, the reconstituted kernel composition has between 15 wt. % and 20 wt. % total water content. In some embodiments, the reconstituted kernel composition has between 20 wt. % and 40 wt. % total water content. In some embodiments, the reconstituted kernel composition has between 25 wt. % and 40 wt. % total water content. In some embodiments, the reconstituted kernel composition has between 30 wt. % and 40 wt. % total water content. In some embodiments, the reconstituted kernel composition has between 35 wt. % and 40 wt. % total water content. In some embodiments, the reconstituted kernel composition has about 15 wt. % total water content. In some embodiments, the reconstituted kernel composition has about 20 wt. % total water content. In some embodiments, the reconstituted kernel composition has about 25 wt. % total water content. In some embodiments, the reconstituted kernel composition has about 30 wt. % total water content. In some embodiments, the reconstituted kernel composition has about 35 wt. % total water content. In some embodiments, the reconstituted kernel composition has about 40 wt. % total water content.

Extrusion Processes

Other aspects of the present disclosure relate to methods of producing a reconstituted kernel composition of the present disclosure. In some embodiments, a reconstituted kernel composition of the present disclosure may be produced by any suitable extrusion process. In some embodiments, a reconstituted kernel composition of the present disclosure may be produced by any of the extrusion processes disclosed, for example, in U.S. Pat. No. 9,107,435 and US 2014/0302225, each of which are hereby incorporated by reference in their entirety. In some embodiments, an extrusion process of the present disclosure may include the steps of: 1) formulating a blend, 2) extruding the blend, and 3) drying the extruded blend. In some embodiments, the blend may be extruded at a temperature and specific mechanical energy (SME) input sufficient to yield a reconstituted kernel composition having a desired texture. In some embodiments, the extrusion process does not include the use of a supercritical fluid.

Extrusion

Any suitable method of extrusion known in the art may be used to generate a reconstituted kernel composition of the present disclosure. In some embodiments, the extrusion process may be a "cooking extrusion," also referred to as a "hot extrusion," or "high-temperature extrusion." In some embodiments, a reconstituted kernel composition of the present disclosure may be made by an extrusion process similar that described in US2011/0206826. Any suitable extruder known in the art can be used to generate a reconstituted kernel composition of the present disclosure. Any suitable screw configuration of the extruder may be chosen to make a reconstituted kernel composition of the present disclosure. In some embodiments, a twin-screw extruder may be used. Any suitable screw speed may be chosen to give the desired physical properties to a reconstituted kernel composition of the present disclosure. Any suitable die known in the art may be used to give the extruded blend a desired shape. Examples of suitable shapes may include the shape of rice, natural kernels, pastas (e.g., orzo, macaroni, fusilli, etc.), baby cereal, BB's, balls, rings, or any other extruded shape known in the art.

Drying

In some embodiments, the controlled drying of a product, such as an extrusion product, may serve to temper and/or condition the product. In some embodiments, tempering and/or conditioning a product, such as an extrusion product, may serve two important purposes; tempering and/or conditioning a product may expedite the relaxation of stresses put on the product which can build up during cooling, and tempering and/or conditioning a product may be used to form desirable molecular structures (e.g., by crystallization) of the product. In some embodiments, an important step of making food products, such as through extrusion, may include controlling the relative humidity, temperature, and time during the controlled drying process to temper and/or condition the food product, such as a reconstituted kernel composition of the present disclosure. In some embodiments, controlling the relative humidity, temperature, and time during the drying process of a reconstituted kernel composition of the present disclosure may help alleviate the incidence of cracks in and/or on the surface of the reconstituted kernel composition. In some embodiments, when the relative humidity is not controlled during the drying process, the water content of the surface of a reconstituted kernel composition may decrease more rapidly than the core of the reconstituted kernel composition, which in turn may cause the surface of the kernel to become glassy while the core becomes rubbery. In some embodiments, the kernel may shrink during the subsequent drying of the rubbery core, which in turn may lead to stresses building up on the reconstituted kernel composition. In some embodiments, it may be that because the glassy surface is highly rigid and can no longer shrink, at some point the stresses may build up on the reconstituted kernel composition to a point at which the reconstituted kernel composition may develop one or more cracks. In some embodiments, the occurrence of stresses on the reconstituted kernel composition may be greatly minimized if the surface and core remain in a rubbery state until late in the drying process. In some embodiments, it may be ideal if both the surface and core of the kernels became glassy at the end of the controlled drying process. In some embodiments, controlling the temperature, relative humidity, and time of drying during the drying process may help to decrease the incidence of cracks, and give the reconstituted kernel composition a desired texture. In some embodiments, using a temperature, relative humidity, and time of drying during the drying process at or near the glass transition temperature of the starch or starches in a reconstituted kernel composition may help to decrease the incidence of cracks, and give the reconstituted kernel composition a desired texture.

Any suitable drying process known in the art can be used to dry the extruded blend to yield a reconstituted kernel composition of the present disclosure. In some embodiments, drying of the blend may be performed at a temperature, relative humidity, and amount of time that is sufficient to yield a reconstituted kernel composition with a desired texture. In some embodiments, a the extruded blend may be dried at a temperature, relative humidity, and amount of time that is sufficient to yield a reconstituted kernel composition where the surface and core of the reconstituted kernel composition become glassy late in the controlled drying process. In some embodiments, drying the extruded blend may be performed at a temperature, relative humidity, and amount of time that is sufficient to prevent kernel cracking in a reconstituted kernel composition of the present disclosure. In some embodiments, the extruded blend may undergo a pre-drying step prior to the drying step. In some embodiments, the pre-drying step may be at a higher temperature than the temperature used in the drying step. In some embodiments, the pre-drying step may occur at a temperature of about 100° C. In some embodiments, the pre-drying step may be for a shorter period of time than the time used when drying the extruded blend. In some embodiments, the pre-drying step may occur for about 5 minutes.

Drying Temperature

In some embodiments, the drying temperature of the drying process of a reconstituted kernel composition of the present disclosure may be at a temperature that is less than about 100° C., 97.5° C., 95° C., 92.5° C., 90° C., 87.5° C., 85° C., 82.5° C., 80° C., 77.5° C., 75° C., or 72.5° C. In some embodiments, the drying temperature of the drying process of a reconstituted kernel composition of the present disclosure may be at a temperature that is greater than about 70° C., 72.5° C., 75° C., 77.5° C., 80° C., 82.5° C., 85° C., 87.5° C., 90° C., 92.5° C., 95° C., or 97.5° C. In some embodiments, the drying temperature of the drying process of a reconstituted kernel composition of the present disclosure may be a temperature range having an upper limit of about 100° C., 97.5° C., 95° C., 92.5° C., 90° C., 87.5° C., 85° C., 82.5° C., 80° C., 77.5° C., 75° C., or 72.5° C., and an independently selected lower limit of about 70° C., 72.5° C., 75° C., 77.5° C., 80° C., 82.5° C., 85° C., 87.5° C., 90° C., 92.5° C., 95° C., or 97.5° C., where the lower limit is less than the upper limit. In some embodiments, the drying temperature of the drying process of a reconstituted kernel composition of the present disclosure may be at a temperature between about 70° C. and about 100° C. In some embodiments, the drying temperature of the drying process of a reconstituted kernel composition of the present disclosure may be at a temperature between about 75° C. and about 95° C. In some embodiments, the drying temperature of the drying process of a reconstituted kernel composition of the present disclosure may be at a temperature between about 80° C. and about 90° C. In some embodiments, the drying temperature of the drying process of a reconstituted kernel composition of the present disclosure may be at a temperature between about 85° C. and about 90° C. In some embodiments, the drying temperature of the drying process of a reconstituted kernel composition of the present disclosure may be at a temperature between about 80° C. and about 95° C. In some embodiments, the drying temperature of the drying process of a reconstituted kernel composition of the present disclosure is at about 80° C. In some embodiments, the drying temperature of the drying process of a reconstituted kernel composition of the present disclosure is at about 81° C. In some embodiments, the drying temperature of the drying process of a reconstituted kernel composition of the present disclosure is at about 82° C. In some embodiments, the drying temperature of the drying process of a reconstituted kernel composition of the present disclosure is at about 83° C. In some embodiments, the drying temperature of the drying process of a reconstituted kernel composition of the present disclosure is at about 84° C. In some embodiments, the drying temperature of the drying process of a reconstituted kernel composition of the present disclosure is at about 85° C. In some embodiments, the drying temperature of the drying process of a reconstituted kernel composition of the present disclosure is at about 86° C. In some embodiments, the drying temperature of the drying process of a reconstituted kernel composition of the present disclosure is at about 87° C. In some embodiments, the drying temperature of the drying process of a reconstituted kernel composition of the present disclosure is at about 88° C. In some embodiments, the drying temperature of the drying process of a reconstituted kernel composition of the present disclosure is at about 89° C. In some embodiments, the drying temperature of the drying process of a reconstituted kernel composition of the present disclosure is at about 90° C.

Drying Humidity

In some embodiments, drying of a reconstituted kernel composition of the present disclosure may be performed under ambient humidity. In some embodiments, drying of a reconstituted kernel composition of the present disclosure may be performed at a controlled humidity. In some embodiments, the controlled humidity may be a relative humidity that is higher than the corresponding ambient humidity. In some embodiments, the relative humidity of the drying process drying of a reconstituted kernel composition of the present disclosure is at a controlled humidity that is less than about 55%, 50%, 45%, or 40%. In some embodiments, the relative humidity of the drying process drying of a reconstituted kernel composition of the present disclosure is at a controlled humidity that is greater than about 35%, 40%, 45% or 50%. In some embodiments, the relative humidity of the drying process drying of a reconstituted kernel composition of the present disclosure is at a controlled humidity that can be any of a range of % humidity having an upper limit of about 55%, 50%, 45%, or 40%, and an independently selected lower limit of about 35%, 40%, or 45%, or 50%, where the lower limit is less than the upper limit. In some embodiments, the relative humidity of the drying process drying of a reconstituted kernel composition of the present disclosure ranges between about 35% and about 55%. In some embodiments, the relative humidity of the drying process drying of a reconstituted kernel composition of the present disclosure ranges between about 35% and about 50%. In some embodiments, the relative humidity of the drying process drying of a reconstituted kernel composition of the present disclosure ranges between about 35% and about 45%. In some embodiments, the relative humidity of the drying process drying of a reconstituted kernel composition of the present disclosure ranges between about 35% and about 40%. In some embodiments, the relative humidity of the drying process drying of a reconstituted kernel composition of the present disclosure ranges between about 40% and about 55%. In some embodiments, the relative humidity of the drying process drying of a reconstituted kernel composition of the present disclosure ranges between about 45% and about 55%. In some embodiments, the relative humidity of the drying process drying of a reconstituted kernel composition of the present disclosure ranges between about 50% and about 55%. In some embodiments, the relative humidity of the drying process drying of a reconstituted kernel composition of the present disclosure ranges between about 40% and about 50%. In some embodiments, the relative humidity of the drying process of a reconstituted kernel composition of the present disclosure is about 35%. In some embodiments, the relative humidity of the drying process of a reconstituted kernel composition of the present disclosure is about 40%. In some embodiments, the relative humidity of the drying process of a reconstituted kernel composition of the present disclosure is about 45%. In some embodiments, the relative humidity of the drying process of a reconstituted kernel composition of the present disclosure is about 50%. In some embodiments, the relative humidity of the drying process of a reconstituted kernel composition of the present disclosure is about 55%.

Drying Time

In some embodiments, the drying time of the drying process of a reconstituted kernel composition of the present disclosure is less than about 220 minutes, 210 minutes, 200 minutes, 190 minutes, 180 minutes, 170 minutes, 160 minutes, or 150 minutes. In some embodiments, the drying time of the drying process of a reconstituted kernel composition of the present disclosure is greater than about 140 minutes, 150 minutes, 160 minutes, 170 minutes, 180 minutes, 190 minutes, 200 minutes, or 210 minutes. In some embodiments, the drying time of the drying process of a reconstituted kernel composition of the present disclosure can be a range of times in minutes having an upper limit of 220 minutes, 210 minutes, 200 minutes, 190 minutes, 180 minutes, 170 minutes, 160 minutes, or 150 minutes and an independently selected lower limit of 140 minutes, 150 minutes, 160 minutes, 170 minutes, 180 minutes, 190 minutes, 200 minutes, or 210 minutes, where the lower limit is less than the upper limit. In some embodiments, the drying time of the drying process of a reconstituted kernel composition of the present disclosure is between about 140 minutes and about 220 minutes. In some embodiments, the drying time of the drying process of a reconstituted kernel composition of the present disclosure is between about 150 minutes and about 210 minutes. In some embodiments, the drying time of the drying process of a reconstituted kernel composition of the present disclosure is between about 160 minutes and about 200 minutes. In some embodiments, the drying time of the drying process of a reconstituted kernel composition of the present disclosure is between about 160 minutes and about 190 minutes. In some embodiments, the drying time of the drying process of a reconstituted kernel composition of the present disclosure is between about 160 minutes and about 180 minutes. In some embodiments, the drying time of the drying process of a reconstituted kernel composition of the present disclosure is between about 160 minutes and about 170 minutes. In some embodiments, the drying time of the drying process of a reconstituted kernel composition of the present disclosure is between about 170 minutes and about 200 minutes. In some embodiments, the drying time of the drying process of a reconstituted kernel composition of the present disclosure is between about 180 and about 200 minutes. In some embodiments, the drying time of the drying process of a reconstituted kernel composition of the present disclosure is between about 190 minutes and about 200 minutes. In some embodiments, the drying time of the drying process of a reconstituted kernel composition of the present disclosure is between about 170 minutes and about 190 minutes. In some embodiments, the drying time of the drying process of a reconstituted kernel composition of the present disclosure is about 140 minutes. In some embodiments, the drying time of the drying process of a reconstituted kernel composition of the present disclosure is about 150 minutes. In some embodiments, the drying time of the drying process of a reconstituted kernel composition of the present disclosure is about 160 minutes. In some embodiments, the drying time of the drying process of a reconstituted kernel composition of the present disclosure is about 170 minutes. In some embodiments, the drying time of the drying process of a reconstituted kernel composition of the present disclosure is about 180 minutes. In some embodiments, the drying time of the drying process of a reconstituted kernel composition of the present disclosure is about 190 minutes. In some embodiments, the drying time of the drying process of a reconstituted kernel composition of the present disclosure is about 200 minutes. In some embodiments, the drying time of the drying process of a reconstituted kernel composition of the present disclosure is about 210 minutes. In some embodiments, the drying time of the drying process of a reconstituted kernel composition of the present disclosure is about 220 minutes.

In some embodiments, any combination of drying temperature, relative humidity and drying time disclosed above may be used. In some embodiments, the drying temperature, relative humidity, and drying time may be selected to reduce or diminish cracking of the reconstituted kernel composition. In some embodiments, the drying temperature, relative humidity and drying time may be selected to increase amylose retrogradation, as compared to a drying temperature that is less than about 85° C., a relative humidity that is less than about 45%, and a drying time that is less than about 180 minutes. In some embodiments, the drying temperature is about 85° celcius, the relative humidity is about 45%, and the drying time is about 180 minutes.

The present disclosure will be more fully understood by reference to the following Examples. They should not, however, be construed as limiting the scope of the present disclosure.

EXAMPLES

Example 1: Production of a Reconstituted Kernel Using a Cereal Flour and Green Lentil Flour A reconstituted kernel was prepared by a high-temperature extrusion process similar to the process as described in U.S. Pat. No. 9,107,435. The extruded, reconstituted kernel was made from a blend that contained the components as described in Table 1. The green lentil flour and cereal flours are represented as percent of dry weight (wt. %) in the blend, while the emulsifier (Dimodan) and water is represented as percent of total weight (% total) of the blend.

TABLE 1

| Components of extruded cereal/green lentil mixture | | | | |
|---|---|---|---|---|
| Blend | Cereal flour | Cereal flour (wt. %) | Green lentil flour (wt. %) | Dimodan (% total) | Water (% total) |
| 1 | Rice | 50 | 50 | 0 | 35 |
| 2 | Rice | 50 | 50 | 0.5 | 35 |
| 3 | Rice | 50 | 50 | 1 | 35 |
| 4 | Rice | 50 | 50 | 2 | 35 |
| 5 | Rice | 50 | 50 | 3 | 35 |
| 6 | Teff | 50 | 50 | 1 | 35 |
| 7 | Sorghum | 50 | 50 | 1 | 35 |
| 8 | White corn | 50 | 50 | 1 | 35 |

Example 2: Production of a Reconstituted Kernel Using Cereal Flour and Chickpea Flour A reconstituted kernel was prepared by a high-temperature extrusion process similar to the process as described in U.S. Pat. No. 9,107,435. The extruded, reconstituted kernel was made from a blend that contained the components as described in Table 2. The chickpea flour and cereal flours are represented as percent of dry weight (wt. %) in the blend, while the emulsifier (Dimodan) and water is represented as percent of total weight (% total) of the blend.

TABLE 2

| Components of extruded cereal/chickpea mixture | | | | |
|---|---|---|---|---|
| Blend | Cereal flour | Cereal flour (wt. %) | Chickpea flour (wt. %) | Dimodan (% total) | Water (% total) |
| 1 | Rice | 50 | 50 | 1 | 35 |
| 2 | Teff | 50 | 50 | 1 | 35 |
| 3 | Sorghum | 50 | 50 | 1 | 35 |
| 4 | White corn | 50 | 50 | 1 | 35 |

Example 3: Production of a Reconstituted Kernel Using Cereal Starch, Cereal Protein, and Green Lentil Flour A reconstituted kernel was prepared by a high-temperature extrusion process similar to the process as described in U.S. Pat. No. 9,107,435. The extruded, reconstituted kernel was made from a blend that contained the components as described in Table 3. The green lentil flour, cereal starch, and cereal proteins are represented as percent of dry weight (wt. %) in the blend, while the emulsifier (Dimodan) and water is represented as percent of total weight (% total) of the blend.

TABLE 3

| Components of extruded cereal starch/cereal protein/green lentil mixture | | | | | |
|---|---|---|---|---|---|
| Blend | Cereal | Cereal starch (wt. %) | Cereal protein (wt. %) | Green lentil flour (wt. %) | Dimodan (% total) | Water (% total) |
| 1 | Rice | 47 | 3 | 50 | 1 | 35 |
| 2 | Rice | 44 | 6 | 50 | 1 | 35 |
| 3 | Corn | 46.5 | 3.5 | 50 | 1 | 35 |
| 4 | Corn | 40 | 10 | 50 | 1 | 35 |

Example 4: Production of a Reconstituted Kernel Using Cereal Starch and Green Lentil Flour A reconstituted kernel was prepared by a high-temperature extrusion process similar to the process as described in U.S. Pat. No. 9,107,435. The extruded, reconstituted kernel was made from a blend that contained the components as described in Table 4. The green lentil flour and cereal starches are represented as percent of dry weight (wt. %) in the blend, while the emulsifier (Dimodan) and water is represented as percent of total weight (% total) of the blend.

TABLE 4

Components of extruded cereal starch/green lentil mixture

| Cereal starch 1 | Cereal starch 1 (wt. %) | Cereal starch 2 | Cereal starch 2 (wt. %) | Green lentil flour (wt. %) | Dimodan (% total) | Water (% total) |
|---|---|---|---|---|---|---|
| Waxy corn starch | 31.6 | High-amylose corn starch | 18.4 | 50 | 1 | 35 |
| Waxy corn starch | 50 | High-amylose corn starch | 0 | 50 | 1 | 35 |
| Waxy corn starch | 0 | High-amylose corn starch | 50 | 50 | 1 | 35 |
| Waxy corn starch | 16.9 | High-amylose corn starch | 33.1 | 50 | 1 | 35 |

Example 5: Production of Reconstituted Kernels Using Rice Flour and Yellow Pea or Chickpea Flour A reconstituted kernel was prepared by a high-temperature extrusion process similar to the process as described in U.S. Pat. No. 9,107,435. The extruded, reconstituted kernel was made from a blend that contained the components as described in Table 5. The rice, yellow pea, and chickpea flours are represented as percent of dry weight (wt. %) in the blend.

TABLE 5

Components of extruded cereal starch/green lentil mixture

| Reconstituted kernel | Rice flour (wt. %) | Yellow pea flour (wt. %) | Chickpea flour (wt. %) |
|---|---|---|---|
| 1 | 50 | 50 | 0 |
| 2 | 30 | 70 | 0 |
| 3 | 0 | 100 | 0 |
| 4 | 50 | 0 | 50 |
| 5 | 30 | 0 | 70 |
| 6 | 0 | 0 | 100 |

The blends shown above that had legume components of 70% or greater showed reasonably good to very good cooking performance. It was found that increasing the content of yellow pea flour from 50% to 70% in the rice/yellow pea blends resulted in only a marginal decrease on the bite characteristics of the kernels upon cooking, and a minor increase in the grittiness of the samples. While samples with 80 to 100% yellow pea showed reasonable texture/bite after cooking, their cooking performance was affected by a higher yellow pea content. That is, it was found that those compositions showed more erosion/leaching of kernels into the cooking liquid. FIG. 1 shows the rice flour/yellow pea flour reconstituted kernel compositions after cooking for 10 minutes in boiling water. The figures show the compositions within 1-2 after cooking.

Figure 2:
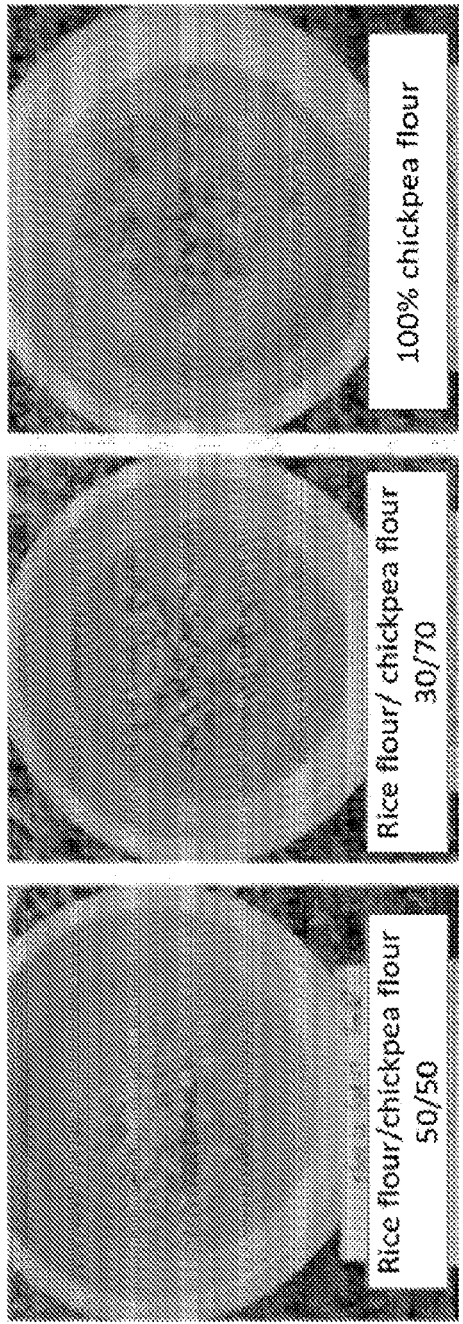
FIG. 2 is a photograph depicting reconstituted kernels including rice flour as a cereal component and chickpea flour as a legume component in accordance with Example 5 of the present disclosure.

Reconstituted kernels including blends of rice and chickpea resulted in kernels with a somewhat softer bite than the rice/yellow pea blends, and with more extensive leaching of the kernels (i.e., cloudiness of the broth). FIG. 2 shows the rice flour/chickpea flour reconstituted kernel compositions after cooking. The figures show the compositions within 1-2 minutes after cooking.

Example 6: Development of a Cooking Performance Index (CPI)

A cooking performance index (CPI) was developed to quantitatively analyze cooking behavior of extruded kernels, as described in Table 6. The CPI was developed to link the cooking behavior of the extruded kernels to the composition of the kernels (e.g., type of cereal flour used, type of legume flour used, differing ratios of cereal to legume flours, addition of emulsifiers, etc.), and the conditions used to make the kernels (e.g., extrusion conditions, drying time, drying temperature, drying humidity, etc.). The CPI was calculated by measuring the fraction of intact kernels, and the resistance of the kernels to chewing.

TABLE 6

Scale for the assessment of cooking performance

| Cooking performance index | Description of characteristics | Example texture |
|---|---|---|
| 1 | Complete or almost complete disintegration of kernel structure; often accompanied by significant levels of soccarat. | Porridge-like |
| 2 | High incidence of broken kernels; high level of kernel disintegration; kernels have a soft bite; high levels of leaching and/or severe erosion that makes the kernels sinter after cooling; sticky to the hand; often accompanied by modest levels of soccarat. | |
| 3 | Roughly equal distribution of intact and broken kernels; kernels have a medium bite; mouthfeel reveals discrete kernels; some leaching and/or erosion of kernels that causes the kernels to lump together but not sinter; does not absorb all water after being cooked, and the non-absorbed water may appear opaque and viscous. | Couscous-like |
| 4 | Kernels stay either intact or that have fractured into a limited number of larger fragments; kernels have a firm bite; low levels of leaching and/or erosion of the kernels; any water not absorbed after cooking for 10 minutes is substantially clear. | Pasta-like |
| 5 | Kernels stay intact; kernels have a very firm bite, a springy bite, and/or an al dente bite; none or very low levels of leaching and/or erosion of the kernels; any water not absorbed after cooking for 10 minutes is clear. | Rice-like |

What is claimed is:

1. A reconstituted kernel composition, comprising:
   a cereal component present in an amount of from about 15 wt. % to about 60 wt. %, wherein the cereal component is one or more cereal flours; and
a legume component;
wherein the weight by weight ratio of the cereal component to legume component is in a range of from 15:80 to 50:50, and
wherein the reconstituted kernel composition further comprises from about 20 wt. % to about 40 wt. % total water content, and
wherein the reconstituted kernel composition comprises an amylose starch component, and
wherein the cereal component, the legume component, and the amylose starch component are present in the weight by weight ratio of 15:80:1, and
wherein the reconstituted kernel composition has an amylose content of from about 8 wt. % to about 50 wt. %,
wherein the amylose content is sufficient to yield a reconstituted composition having a cooking performance index (CPI) of 1 to 5.

2. The reconstituted kernel composition of claim 1, wherein the legume component is selected from the group consisting of red lentil flour, green lentil flour, brown lentil flour, chickpea flour, yellow pea flour, fava bean flour, tepary bean flour, runner bean flour, lima bean flour, pinto bean flour, kidney bean flour, black bean flour, green bean flour, moth bean flour, adzuki bean flour, urad bean flour, mung bean flour, ricebean flour, cowpea flour, Indian pea flour, hyacinth bean flour, soybean flour, winged bean flour, pigeon pea flour, velvet bean flour, jack bean flour, guar flour, sword bean flour, horse gram flour, tarwi flour, lupine bean flour, and peanut flour, and any combination thereof.

3. The reconstituted kernel composition of claim 1, wherein the legume component is selected from the group consisting of a red lentil flour, a green lentil flour, a chickpea flour, a yellow pea flour, and any combination thereof.

4. The reconstituted kernel composition of claim 1, wherein the reconstituted kernel composition further comprises an emulsifier component.

5. The reconstituted kernel composition of claim 4, wherein the reconstituted kernel composition comprises up to 0.6 wt. % of the emulsifier component.

6. The reconstituted kernel composition of claim 4, wherein the emulsifier component is selected from the group consisting of phospholipids, enzyme digested lecithin, enzyme-treated lecithin, glycerin fatty acid esters, monoglycerides, acetic acid esters of monoglycerides, lactic acid esters of monoglycerides, citric acid esters of monoglycerides, succinic acid esters of monoglycerides, diacetyl tartaric acid esters of monoglycerides, polyglycerol esters of fatty acids, polyglycerol polyricinoleate, sorbitan esters of fatty acids, propylene glycol esters of fatty acids, sucrose esters of fatty acids, calcium stearoyl di lactate, and mixtures thereof.

7. The reconstituted kernel composition of claim 1, wherein the amylose starch component is selected from the group consisting of corn starch, high amylose corn starch, rice starch, and any combination thereof.

8. The reconstituted kernel composition of claim 1, wherein the reconstituted kernel composition comprises about 35 wt. % of the total water content.

9. The reconstituted kernel composition of claim 1, wherein the cereal flour is selected from the group consisting of a rice flour, a teff flour, a sorghum flour, a white corn flour, and any combination thereof.

* * * * *